US008856881B2

(12) United States Patent
Mouleswaran et al.

(10) Patent No.: US 8,856,881 B2
(45) Date of Patent: Oct. 7, 2014

(54) METHOD AND SYSTEM FOR ACCESS CONTROL BY USING AN ADVANCED COMMAND INTERFACE SERVER

(75) Inventors: S. Chandra Mouleswaran, Tamil Nadu (IN); Kamalesh Viswanatha, Andhra Pradesh (IN); Mahesh Kumar K., Andhra Pradesh (IN); Snigdendhu Misra, West Bengal (IN); Pawankumar Satyawali, Karnataka (IN); Srikant Attravanam, Andhra Pradesh (IN)

(73) Assignee: Genpact Global Holdings (Bermuda) Ltd. (BM)

( * ) Notice: Subject to any disclaimer, the term of this patent is extended or adjusted under 35 U.S.C. 154(b) by 934 days.

(21) Appl. No.: 12/586,576

(22) Filed: Sep. 24, 2009

(65) Prior Publication Data

US 2010/0218238 A1 Aug. 26, 2010

(30) Foreign Application Priority Data

Feb. 26, 2009 (IN) .............................. 370/DEL/2009

(51) Int. Cl.
*H04L 29/06* (2006.01)
*H04L 9/32* (2006.01)
*G06F 21/33* (2013.01)
*H04L 29/08* (2006.01)

(52) U.S. Cl.
CPC .......... *H04L 63/0807* (2013.01); *H04L 9/3226* (2013.01); *G06F 21/335* (2013.01); *H04L 2209/60* (2013.01); *H04L 67/08* (2013.01); *H04L 63/10* (2013.01)
USPC .................................................... 726/4; 5/28

(58) Field of Classification Search
CPC .............. H04L 63/0807; H04L 9/3213; H04L 63/0823
USPC ................................................... 726/4, 5, 28
See application file for complete search history.

(56) References Cited

U.S. PATENT DOCUMENTS

| | | | |
|---|---|---|---|
| 7,685,206 B1 * | 3/2010 | Mathew et al. ............... | 707/785 |
| 7,712,127 B1 * | 5/2010 | Thompson et al. ............... | 726/4 |
| 7,913,300 B1 * | 3/2011 | Flank et al. ..................... | 726/12 |
| 2002/0178119 A1 * | 11/2002 | Griffin et al. ................... | 705/54 |
| 2005/0108526 A1 * | 5/2005 | Robertson ...................... | 713/166 |
| 2005/0193196 A1 * | 9/2005 | Huang et al. .................. | 713/166 |
| 2007/0156693 A1 * | 7/2007 | Soin et al. ........................ | 707/9 |
| 2007/0157297 A1 * | 7/2007 | Patrick .............................. | 726/6 |
| 2008/0120302 A1 * | 5/2008 | Thompson et al. ............... | 707/9 |
| 2008/0256606 A1 * | 10/2008 | Koikara et al. .................... | 726/4 |
| 2008/0289036 A1 * | 11/2008 | Kandasamy et al. ........... | 726/21 |

* cited by examiner

*Primary Examiner* — Jeffrey Pwu
*Assistant Examiner* — Thong Truong
(74) *Attorney, Agent, or Firm* — William L. Botjer

(57) ABSTRACT

A method and system for allowing one or more users controlled access to at least one server from a plurality of servers by using an advanced command interface (ACI) server. The method and system include receiving a command at the ACI server from the one or more users to access the at least one server. Further, the method and system include comparing the command and impact of the command with a predefined set of criteria, which includes a plurality of skill and role levels corresponding to the one or more users. Subsequently, the command is transmitted from the ACI server to the at least one server for processing at the at least one server. The command is transmitted based on the predefined set of criteria. Thereafter, a response of the processed command from the at least one server is received. Finally, the method and system include forwarding the response of the processed command to the one or more users.

20 Claims, 5 Drawing Sheets

METHOD AND SYSTEM FOR ACCESS CONTROL BY USING AN ADVANCED COMMAND INTERFACE SERVER

REFERENCE TO RELATED APPLICATION

This application claims the priority of a provisional patent application filed in India, Ser. No. 370/DEL/2009, filed Feb. 26, 2009, titled, 'ADVANCED COMMAND INTERFACE TO CONTROL NETWORK SERVER ACCESS.'

BACKGROUND OF THE INVENTION

The present invention, in general, relates to access control in a computer network. In particular, the invention relates to a method and system for providing access control using an advanced command interface (ACI) server present in the computer network.

In a computer network, user access to stored data needs to be controlled to prevent security breaches in any organization. Security is an important factor for access control systems that grant access to multiple users, especially when access can be obtained from outside a restricted area, for example, by hacking the login identity and password of a user. As systems become more complicated and access to data needs to be more widely distributed, security systems become more complex. The demand for secure and efficient computer systems is increasing with time. Access control is usually performed by providing controlled access rights to the users of a computer system. Also, these access rights define the extent of privileges assigned to the users of the computer system. Various security systems are integrated in an operating system of the computer system to provide access control to the users.

Various access control systems are available which are designed to provide restricted and monitored access rights to users of the computer network. An example of such an access control system is Cisco System Inc's Cisco Secure Access Control System (ACS). ACS provides controlled access to the users of the computer network in three stages—authentication, authorization, and accounting (AAA)—through a centralized server. During the authentication stage, the access rights of each user in the computer network are identified based on the users' login identity and password. In the authorization stage, the access control policy is implemented, and the users are provided with one-time or temporary authorization. Lastly, in the accounting stage, security server information is collected and used for auditing and reporting. In another example, Fox Technologies provides an access control system in which a central server defines the users and the corresponding applications they can access. Additionally, the central server authenticates the users to access the data stored on a remote machine on the basis of the roles assigned to the users.

In yet another example, Sun Microsystems developed Application Server 7 Access Control to deal with security issues. Application Server 7 Access Control has two main functions—authentication and authorization, which are performed at separate stages and are independent of each other. Since the two distinct operations are performed at separate stages, the overall computing requirement and complexity of the system increases with Application Server 7.

To maintain data security and integrity, the access control systems described above use a role-based access control (RBAC). A role is mainly based on a set of jobs assigned to each user of an organization corresponding to a particular job position or job description of the user. In such a scenario, typically, the system administrator grants permission to different roles, and groups various users under specific roles that exist in the organization. The access control system includes an access control list (ACL) stored in a centralized server which includes the list of users and their corresponding access rights based on the roles and job descriptions. To access a particular server, a user needs to send a request to the centralized server, which authorizes the request based on the ACL.

Using only the RBAC system is disadvantageous in several ways. Once the roles have been assigned to a group of users, a new user from the group of users may execute commands at various servers according to the access rights, and due to lack of proficiency in executing commands, the user may execute high-impact commands. The execution of the high-impact commands may result in an unwanted change in the data stored on the servers.

Since the access control systems are based only on the roles assigned to the users, the systems are unable to perform mistake proofing at different servers on which data is stored. Mistake proofing is a procedure in which the access control system is able to control the execution of intentional as well as unintentional commands provided to the computer network by the users. There may be few commands that may cause an unwanted change at the servers on which the command is executed. For example, a reboot command executed at the server may cause complete shutdown of the server for some time. Therefore, such commands should be executed only by a system/network expert in the organization, and every engineer should not have the rights to run such critical and high-impact commands. As explained above, commands may be intentionally or unintentionally executed by the user; for example, a hacker may execute commands from outside the organization to obtain confidential information about the organization or an engineer may unintentionally execute a critical command without knowing the consequences. Also, these commands have to be executed manually by the users, and manual execution may cause errors in the system due to lack of expertise of the user or other factors.

In light of the foregoing, there is a need for a method and system for providing an access control system for controlled access to remote servers in such a way that mistake proofing can be implemented. This will protect the system from both intentional and unintentional mistakes. Further, the access control system should minimize human intervention involved in the execution of commands, and thus, reduce errors to make the system more robust.

SUMMARY OF THE INVENTION

An objective of the present invention is to provide a method for providing one or more users with controlled access to at least one server from a plurality of servers by using an advanced command interface (ACI) server. A command is received at the ACI server from the one or more users to access the at least one server. The command and impact of the command is compared with a predefined set of criteria, which includes a plurality of skill and role levels corresponding to one or more users. Subsequently, the command from the ACI server is transmitted to the at least one server for processing. However, the command is transmitted only if the predefined set of criteria is fulfilled. Thereafter, a response of the processed command is received from the at least one server. Finally, the response of the processed command is forwarded to the one or more users.

Another objective of the present invention is to provide an advanced command interface (ACI) server for providing one or more users with controlled access to at least one server from a plurality of servers. The ACI server includes a receiving module for receiving a command from the one or more users to access the at least one server. The ACI server includes a comparing module for comparing the command and impact of the command with a predefined set of criteria, which includes a plurality of skill and role levels corresponding to the one or more users. The ACI server further includes a processing module configured to perform various steps. The processing module transmits the command from the ACI server to the at least one server for processing. The command is transmitted on the basis of the predefined set of criteria. The processing module receives a response of the processed command from the at least one server, and forwards the response to the one or more users.

BRIEF DESCRIPTION OF THE DRAWINGS

The embodiments of the present invention will hereinafter be described in conjunction with the appended drawings that are provided to illustrate and not to limit the present invention, wherein like designations denote like elements, and in which.

Skilled artisans will appreciate that the elements in the figures are illustrated for simplicity and clarity to help improve understanding of the embodiments of the present invention and are not intended to limit the scope of the present invention in any manner whatsoever.

DETAILED DESCRIPTION OF THE INVENTION

Various embodiments of the present invention relate to a method and system for providing one or more users with controlled access to at least one server from a plurality of servers by using an advanced command interface (ACI) server. The method includes receiving a command at the ACI server. The command may be any keyword used to execute a set of instructions, and consequently, perform an action on the at least one server that may be remotely located. The command and the associated impact of the command are compared with a predefined set of criteria at the ACI server. The predefined set of criteria includes a plurality of skill and role levels corresponding to the one or more users. Further, based on the result of the comparison, the command is transmitted from the ACI server to the at least one server for processing.

Figure 1:
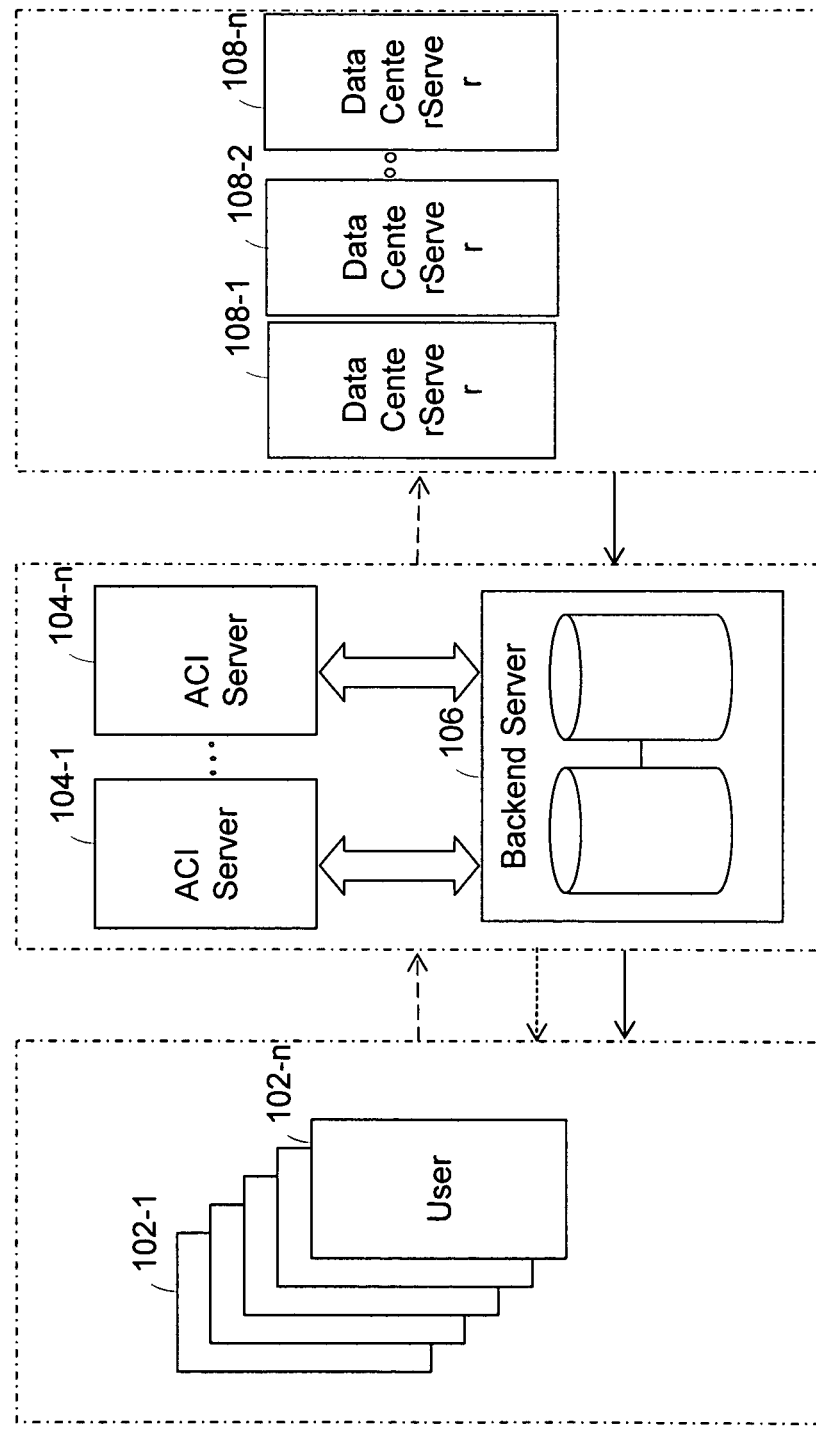
FIG. 1 is an exemplary environment illustrating an access control system, where various embodiments of the present invention can be practiced.

FIG. 1 is an exemplary environment 100 illustrating an access control system in which various embodiments of the present invention can be practiced. The environment 100 is a computer network that includes one or more users 102-1, 102-2, and 102-n (hereinafter referred to as users 102); a set of advanced command interface (ACI) servers including one or more servers such as servers 104-1, 104-2, and 104-n (hereinafter referred to individually as ACI server 104 and collectively ACI servers 104); a backend server 106; and a plurality of servers 108-1, 108-2, and 108-n (hereinafter referred to as servers 108). The variable 'n' used for the users, the ACI servers, and the servers will vary depending on the number of the users, ACI servers, and the servers used during the implementation of the present invention.

ACI server 104 receives commands from users 102 to execute the commands at servers 108. Based on the authorization level of users 102 the ACI server 104 transmits the commands to the servers 108 for processing. The authorization level of the users is checked by applying a number of filtering rules that are stored at a backend server 106 which is connected to the ACI server. The backend server 106 essentially works as a database server and performs various functions such as data analysis, storage, data manipulation, and archiving. Further, ACI server 104 receives a response of the processed commands from the servers 108 and forwards the response to users 102.

Typically, users 102 are web clients that are capable of communicating over a computer network through access devices. Examples of access devices include a laptop, a computer system, PDA, smart phones and the like, ACI server 104 is a centralized server that performs authentication of users 102 by a single computer or a network system in which individual functions are performed by separate computers connected via a standard data network. Users 102 are provided controlled access through ACI server 104 that performs the function of an application server and an authentication server for user authentication.

Further, each of the ACI servers 104 is supported by an operating system. In one example, each of the ACI servers 104 is supported with Microsoft dot net framework running on Microsoft Windows Server operating system and Internet Information Services (IIS) as a web application server.

Backend server 106 may be any database server, for example, Microsoft SQL Server 2005 database server, connected via any wired or wireless connection to ACI servers 104. Further, one or more backend servers 106 are remotely located or distributed at various locations. These one or more backend servers 106 may be logically connected to ACI server 104. In accordance with an embodiment of the present invention, the backend server 106 can be part of the ACI server 104.

The servers 108 may be any dedicated hardware capable of performing communication with users 102. Examples of servers 108 may include, a computer system running on a server operating system, network devices such as routers and switches, and other devices that may support the character user interface (CUI) and may be present in the data center or in any server farm hosted by a specific client. The operating system may be Unix or any other server operating system. Each of the ACI servers 104 may be connected to servers 108 using a standard network protocol, for example, Telecommunications network (Telnet), Secure Shell (SSH), and HyperText Transfer Protocol (HTTP).

Figure 2:
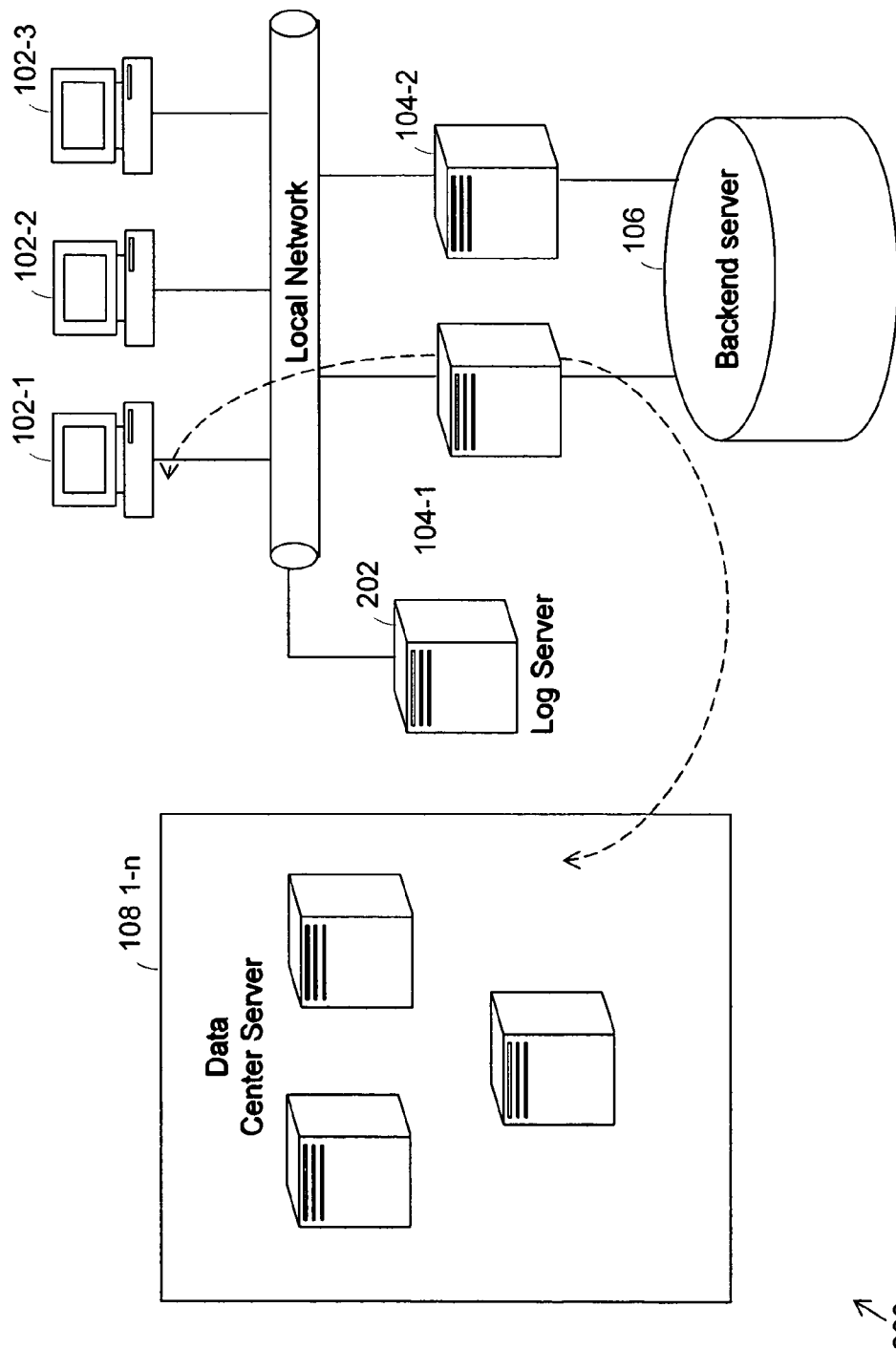
FIG. 2 is an access control system, in accordance with an embodiment of the present invention.

FIG. 2 illustrates an access control system 200, in accordance an embodiment of the present invention. The access control system 200 includes a log server 202, users 102, ACI servers 104, backend server 106, and servers 108. The connection between users 102, ACI servers 104, backend server 106, and servers 108 is explained in detail in conjunction with FIG. 1. Furthermore, the log server 202 is logically connected to users 102 and to each of the ACI servers 104 via a dedicated data network such as a local area network (LAN), a wide area network (WAN), a wire-line network or any other similar networks.

A log is maintained at log server 202 corresponding to the steps performed (described in detail in conjunction with FIG. 3) to provide users 102 with controlled access to at least one server of the servers 108. In accordance with an embodiment of the present invention, the executed commands and the corresponding responses are stored at log server 202 which can be retrieved by a power user to analyze the execution process. The power user has additional privileges and can be any user from the users 102 or can be a system administrator. In case one or more users other than the power user from users 102 want to perform analysis on the log maintained at log server 202, the one or more users need to send a request to ACI server 104. ACI server 104 allows one or more users on the basis of a predefined set of criteria. In another embodiment of the present invention, depending on the load on ACI server 104, the log can be maintained at ACI server 104. In this case, if the load on ACI server 104 is above a predefined limit, the log is maintained at log server 202 or a separate server.

In one example, the whole session that relates to the overall communication between users 102 and the at least one server 108 can be retrieved and replayed. Maintaining a log is advantageous as the system administrator or power user can perform detailed auditing, debugging, troubleshooting, and root cause analysis of any error that may occur during communication between users 102 and at least one server 108.

Figure 3:
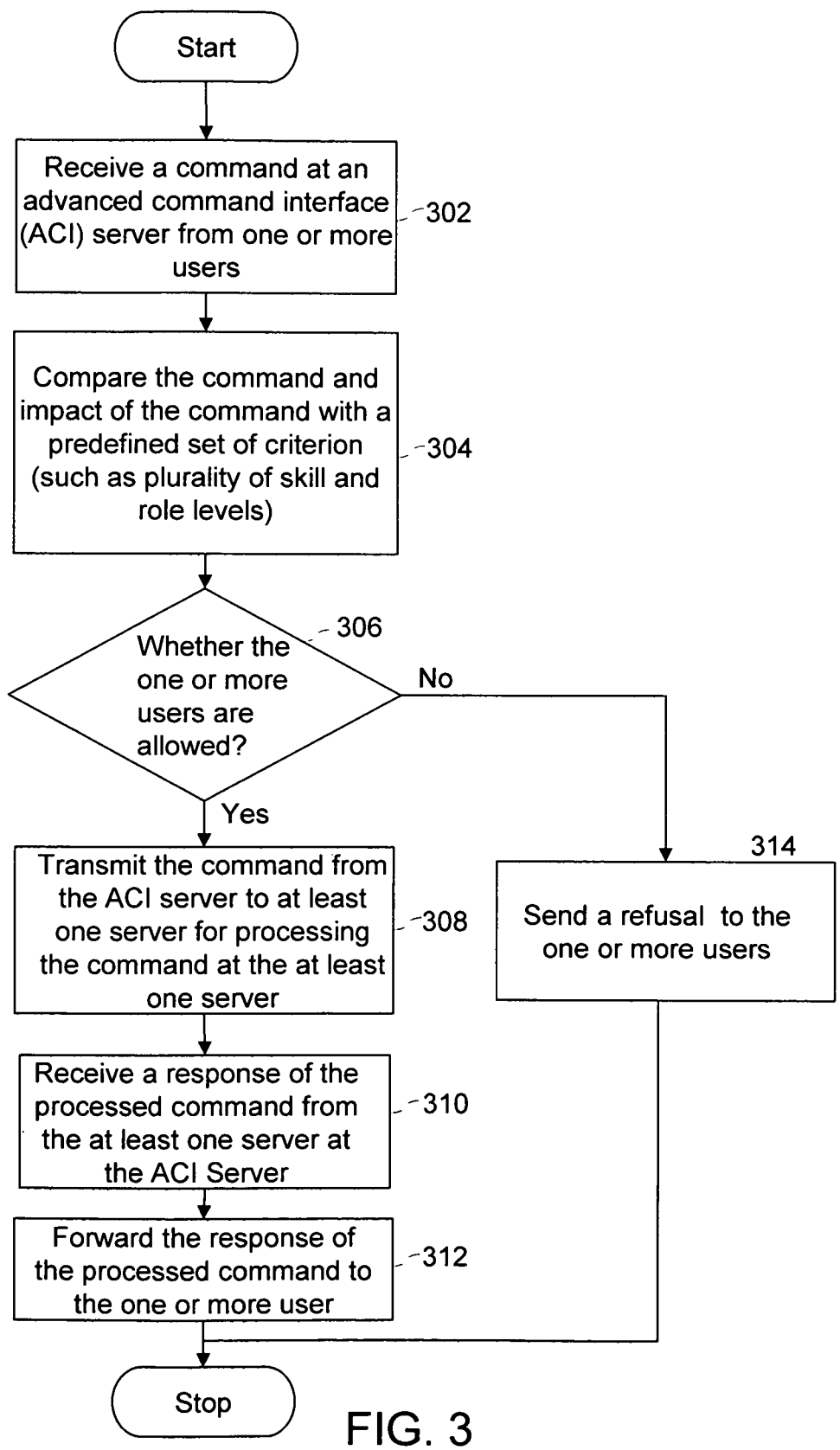
FIG. 3 is a flow diagram illustrating a method for providing one or more users with controlled access to at least one server by using an advanced command interface (ACI) server, in accordance with an embodiment of the present invention.

FIG. 3 is a flow diagram illustrating a method for providing one or more users with controlled access to at least one server from a plurality of servers by using an advanced command interface (ACI) server, in accordance with an embodiment of the present invention. To describe the method, references will be made to various objects described in FIG. 1 and FIG. 2, although it will be apparent to those skilled in the art that the method can be applicable to any other embodiment of the present invention.

At step 302, a command is received at ACI server 104 from users 102 to access at least one server 108. The command may be any keyword used to execute a set of instructions, and consequently, perform an action on at least one server 108. Once, the command is received at ACI server 104 the authentication of users 102 is performed by applying a number of filtering rules which are stored in a list at the backend server 106.

At step 304, to implement the filtering rules, the command and impact of the command is compared with a predefined set of criteria. The predefined set of criteria includes a plurality of skill, role levels, and a list of servers corresponding to an authorization level of each user 102. Further, the predefined set of criteria includes users 102 corresponding to a ticket-based authorization. These predefined set of criteria are stored in the backend server 106. Additionally, the impact of the command refers to the effect the command can cause after execution at servers 108. For example, execution of a reboot command will cause a complete shutdown at servers 108.

As a first filtering rule, the command and impact of the command is compared with the plurality of skill levels assigned to each user 102. Users 102 are classified in the list on the basis of their skill levels. For example, a group of users can be classified into a category of specialists based on their skills and proficiency in managing and executing commands at servers 108. Another group of users from users 102 with minimum privileges to access and execute commands at servers 108 can be classified into a category of engineers, and so forth. It will be apparent to a person with ordinary skill in the art that each user 102 can be associated with more than one skill level, and each skill level can further be divided into different levels. For example, an organization may have Level 1 or Level 2 specialists with different privileges to access servers 108.

As a second filtering rule, the command and impact of the command is compared with a plurality of role levels corresponding to users 102. Roles are assigned to users 102 on the basis of a set of jobs assigned to them according to their job positions. The power user or a system administrator grants permission to different roles, and groups various users under specific roles that exist in the organization.

Further, as a third filtering rule, when the command is received from users 102, the command and impact of the command is compared with a list of servers corresponding to an authorization level of each user 102. The list of servers is prepared by the power user or the system administrator based on a predetermined criteria. The list of servers includes the number of servers from the plurality of servers 108 on which each user 102 has authorized access. It will be apparent to a person with ordinarily skill in the art that user details, such as username of users 102, are compared with the list of servers. The list of servers includes an Internet Protocol (IP) address of servers 108 on which users 102 have access rights.

Each user 102 generates a ticket to access at least one server 108. In one example, when there is a server downtime due to preventive or predictive maintenance, the ticket is automatically generated on behalf of users 102. The ticket provides users 102 a unique key used as a proof for authorization. The unique key is generated by a system administrator and helps track the status of the tickets that are generated by users 102 present in the computer network. Further, a list of authorized users is prepared which includes users 102 that have ticket-based authorization. In accordance with an embodiment of the present invention, tickets are generated using a customer relationship management (CRM) system. Further, as a fourth filtering rule, when the command is received from users 102, the command and impact of the command is compared with the list of users to check whether users 102 have ticket-based authorization to execute the command at the at least one server 108. Further, the ticket is authorized for a predefined time. If users 102 do not access the at least one server 108 within the predefined time, a new ticket needs to be generated to access the at least one server 108.

Subsequently, at step 306, ACI server 104 checks whether users 102 are allowed to execute the received command at the at least one server 108. Additionally, the users 102 are allowed to execute the command at the at least one server 108 based on their qualification against the filtering rules.

If users 102 are allowed, i.e, they qualify the filtering rules then, at step 308, the command is transmitted from ACI server 104 to at least one server 108 for processing. Subsequently, at step 310, a response of the processed command is received at ACI server 104 from the at least one server. At step 312, the response of the processed command is forwarded by ACI server 104 to users 102.

Alternatively, if the users 102 do not qualify the filtering rules and have sent a high-level command to execute at a server for which they are not authorized, then, at step 314, ACI server 104 sends a refusal to access the at least one server 108 to users 102. After receiving the refusal, users 102 may forward a request to a power user using ACI server 104. The power user has additional privileges to authorize the request. The power users are predetermined and their names are stored at each of the ACI servers 104. The request is forwarded to obtain access rights to process the command at the at least one server 108. In one example, access rights to process the command at the at least one server is authorized by the power user for a predefined time.

In accordance with an embodiment of the present invention, when users 102 receive a refusal to access the at least one server 108, users 102 may not forward the request to the power user based on the criticality of situation.

In accordance with another embodiment of the present invention, users 102 are provided with controlled access to at least one server 108 through a password shield stored at ACI server 104. The present invention enables the single sign-on (SSO) mechanism for users 102. Users 102 provide a login name and a user-generated first password to ACI server 104 to access the at least one server 108. ACI server 104 applies various filtering rules and provides the identified list of servers from servers 108 on which users 102 have an authorized access. To provide secure access to users 102, ACI server 104 provides a second password to the at least one server 108. The second password is encrypted and stored in the database of ACI server 104.

In accordance with another embodiment of the present invention, Active Directory (AD) domain services, for example, Microsoft Active directory domain services can be used to provide controlled access to users 102. The login name and the user-generated first password is provided by users 102, and the second password is provided by ACI server 104. In this case, the authentication for the user-generated first password is provided by the AD domain services or any other single sign-on (SSO) system. The present embodiment is useful specifically when ACI server 104 is accessed by multiple users from outside the organization. Therefore, to separate the username and password of the various users, AD domain services are used to authenticate the user-generated first password for a group of users, and SSO systems are used to authenticate the user-generated first password for another group of users. However, in both cases, ACI server 104 is used to authenticate the second password by applying various filtering rules.

Further, the present embodiment of the invention facilitates isolation among different groups of users. For example, a private organization may provide controlled access to various groups of users, and each group may belong to a different client. In such cases, to maintain isolation of data, separate databases of ACI server 104 are used to store data related to each client. These databases are logically separated but are part of a single ACI server.

Figure 4:
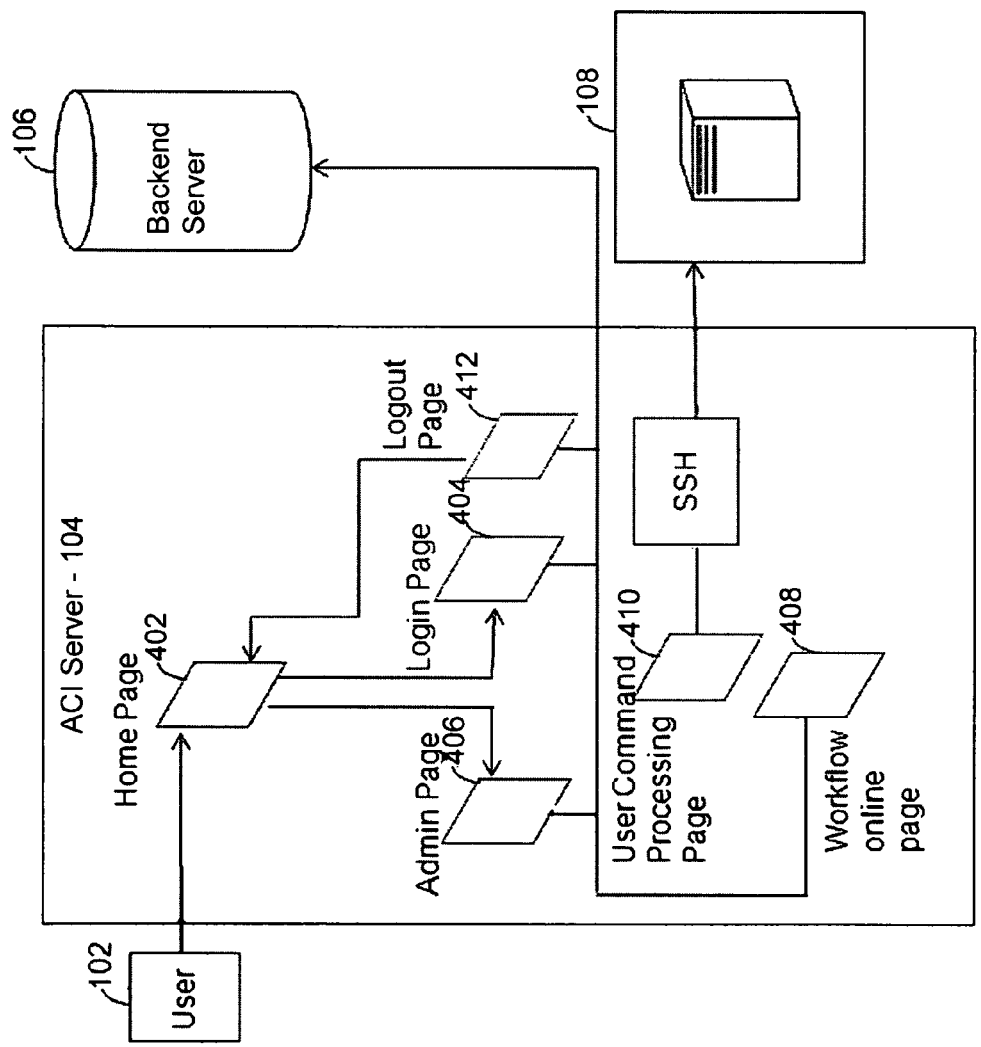
FIG. 4 is a schematic diagram illustrating a method for providing one or more users with controlled access to at least one server by using an ACI server, in accordance with an embodiment of the present invention.

FIG. 4 is a schematic diagram 400 illustrating a method for providing one or more users with controlled access to at least one server from a plurality of servers by using an advanced command interface (ACI) server, in accordance an embodiment of the present invention.

The schematic diagram 400 includes a user 102, a home page 402, a login page 404, an administrator page 406, a workflow online page 408, a user command processing page 410, a logout page 412, Server 108 and backend server 106. User 102 is directed through various pages before the user 102 is provided access to server 108. Additionally, these pages are provided by ACI server 104.

User 102 is directed to the home page 402 of ACI server 104, and subsequently, to access a particular application at server 108, user 102 is directed to the login page 404 to provide the login name and user-generated first password. Once user 102 provides the user-generated first password, the second password is provided through ACI server 104. The second password is used as the password shield (as described in conjunction with FIG. 3) to provide controlled access to user 102 to server 108.

In one example, user 102 generates a ticket to execute a command at a specific server location of server 108. The ticket is forwarded to the power user that identifies through administrator page 406 and workflow online page 408, the access rights of user 102 based on the filtering rules stored at the backend server 106 of ACI server 104.

Thereafter, a command is sent by user 102 which is processed through user command processing page 410, and user 102 is connected through the SSH protocol to the remotely located server 108 from where it can execute the command at the desired server location. After the completion, user 102 logs out and is directed to the logout page 412. It will be apparent to a person with ordinary skill in the art that when user 102 wants to access multiple locations of servers 108, user 102 will first have to log out from the current page of the server location and then log in to a different server location. To maintain appropriate quality and to reduce the number of mistakes, user 102 is provided with limited sessions to access different locations of servers 108. Further, the number of sessions can be controlled by the power user. Additionally, user 102 is not given a direct access to the at least one server 108. User 102 can access various locations of servers 108 only through the ACI server 104.

In accordance with an embodiment of the present invention, ACI server 104 can be used as a centralized server for desktop remote management through the remote desktop protocol (RDP). The centrally placed ACI server 104 remotely configures, diagnoses, isolates, and repairs infected desktops of users 102. Further, the present invention can be implemented in virtual desktop infrastructure (VDI) where a set of virtual machines is used to manage, upgrade, and install patches at the desktops of users 102 virtually, and not physically. The control in VDI is with a centralized server that delivers and manages individual desktops. It will be apparent to a person with ordinary skill in the art that the steps as described in conjunction with FIG. 3 will be implemented in the VDI.

Figure 5:
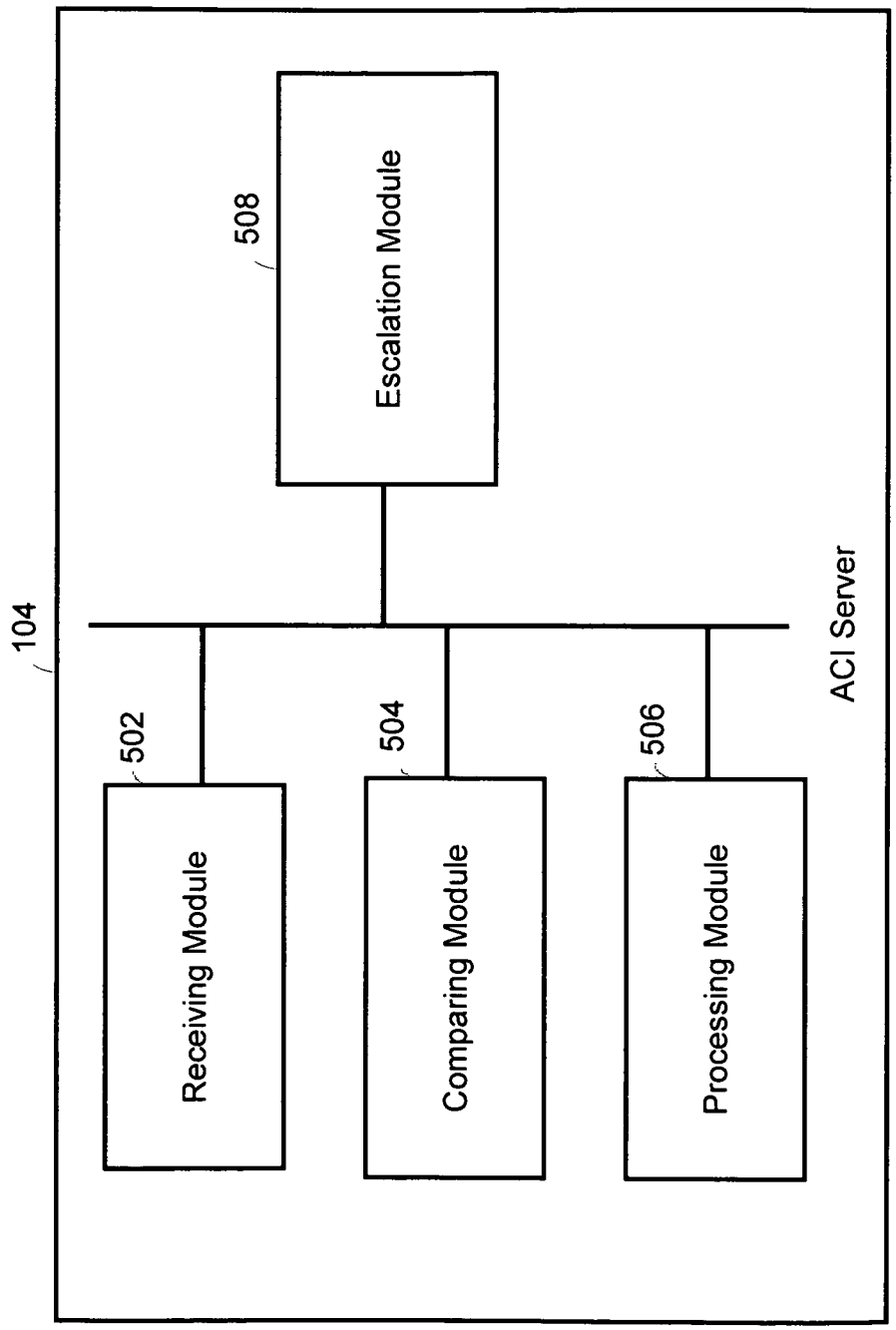
FIG. 5 is a block diagram illustrating various modules of an ACI server, in accordance with an embodiment of the present invention.

FIG. 5 is a block diagram illustrating various modules of an advanced command interface (ACI) server, in accordance an embodiment of the present invention. The ACI server 104 includes a receiving module 502, a comparing module 504, an escalation module 506, and a processing module 508.

The receiving module 502 receives a command from the users 102 to access the at least one server 108. The comparing module 504 compares the command and impact of the command with a predefined set of criteria. The predefined set of criteria includes a plurality of skill and role levels corresponding to users 102. Further, the predefined set of criteria includes users 102 corresponding to ticket-based authorization and a list of servers corresponding to an authorization level of each user 102.

If the predefined set of criteria is met, the processing module 506 performs various steps. Firstly, processing module transmits the command from ACI server 104 to the at least one server 108 for processing. The command is transmitted based on the predefined set of criteria. Processing module 506 further receives a response to the processed command from the at least one server, and then forwards the response to users 102.

If the predefined set of criteria is not met, the escalation module 508 sends a refusal to access the at least one server 108 to users 102. Subsequently, the escalation module 508 forwards a request to obtain access rights to process the command at the at least one server to a power user when the refusal to access the at least one server is received by users 102. Finally, the escalation module 508 receives an authorization from the power user. The authorization includes access rights to process the command at the at least one server 108 by users 102.

In accordance with an embodiment of the present invention, to process multiple commands received from users 102, each of the ACI servers 104 works concurrently, i.e., ACI server 104 receives the command and starts the processing at the same time. Further, the commands are distributed among ACI servers 104 by applying various load balancing techniques.

Various embodiments of the present invention facilitate mistake proofing at servers 108 by providing skill-based authorization. In such cases, only high-level specialists of an organization can execute high-level commands. Therefore, intentional and unintentional execution of commands can be controlled. ACI server 104 of the present invention interfaces with a customer relationship management (CRM) to generate tickets to provide users 102 with controlled access to at least one server 108. Further, users 102 are provided access to at least one server 108 for a limited number of sessions, and hence, the probability of errors is reduced. The invention facilitates maintaining a log at the log server 202 which can be retrieved to identify errors. The log includes user-wise, server-wise, and session-wise reports. These reports can be used in various change management auditing procedures. The log helps in the formation of data warehouses. These data warehouses are used for data storage, means to retrieve data and analyze data.

The method and system of the present invention, minimizes human intervention for the execution of commands by users 102. Further, the commands are executed at the at least one server 108 by using ACI server 104. Further, the present invention provides faster implementation since installation of any software or file is not required at servers 108. Hence, the present invention can be implemented without any changes in the conventional system, and thus, the invention is eco-friendly. ACI server 104 provides a consolidated console to manage servers 108 that may be remotely located or may be distributed at more than one location. Further, the present invention can be implemented to provide various services such as desktop remote management and virtual desktop infrastructure. Additionally, the process of providing users 102 with authentication, authorization, and accounting is not done at separate stages. These three functions are performed collectively by ACI server 104, which reduces the complexity of the overall access control system.

The system, as described in the present invention, or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The servers used in an advanced command interface (ACI) server for providing one or more users with controlled access to at least one server from a plurality of servers, the system comprise a computer, an input device, and a display unit. The computers comprise a microprocessor, which is connected to a communication bus. The servers also include a memory, which may include Random Access Memory (RAM) and Read Only Memory (ROM). Further, the servers comprise a storage device, which can be a hard disk drive or a removable storage drive such as a floppy disk drive, an optical disk drive, and the like. Furthermore, the storage device can be other similar means for loading computer programs or other instructions on the servers.

To process input data, the computer system executes a set of instructions that are stored in one or more storage elements. The storage elements may also store data or other information, as desired, and may be an information source or physical memory element present in the processing machine.

The set of instructions may include various commands that instruct the processing machine to perform specific tasks such as the steps constituting the method of the present invention. The set of instructions may be in the form of a software program. The software may be in various forms such as system or application software. The software may also be in the form of a collection of separate programs, a program module with a larger program, or a portion of a program module. Further, the software may include modular programming in the form of object-oriented programming. Processing of input data by the processing machine may be in response to user commands or to the results of previous processing. The set of instructions may be embodied as a computer program product comprising instructions stored in a computer usable medium having a computer readable program code embodied therein.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for providing one or more users with controlled access to at least one server from a plurality of servers by using an advanced command interface (ACI) server, the method comprising the steps of:
   receiving, by means of a processor, a username and a user-generated first password at the ACI server from the one or more users to access the at least one server;
   authenticating the username and the user-generated first password at the ACI server;
   sending a second password from the ACI server to the at least one server based on the authentication of the username and the user-generated first password at the ACI server;
   receiving a command at the ACI server from the one or more users to process the command at the at least one server;
   comparing the command and impact of the command with a predefined set of criteria, the predefined set of criteria including a plurality of skill and role levels corresponding to the one or more users, wherein the predefined set of criteria comprises a list of the one or more users corresponding to a ticket-based authorization and wherein the ticket-based authorization is provided for a predefined time interval;
   transmitting the command from the ACI server to the at least one server for processing the command at the at least one server, wherein the command is transmitted based on the predefined set of criteria;
   receiving a response of the processed command from the at least one server based on the second password;
   forwarding the response of the processed command to the one or more users; and
   maintaining a log at a log server of the above steps performed to provide the one or more users with controlled access to the at least one server.

2. The method of claim 1, wherein the predefined set of criteria further comprises a list of servers corresponding to an authorization level of each of the one or more users.

3. The method of claim 1, wherein the second password is encrypted and stored at the ACI server.

4. The method of claim 1, wherein the plurality of skill and role levels corresponding to the one or more users is stored in a database on the ACI server.

5. The method of claim 1, further comprising the step of sending a refusal by the ACI server to the one or more users when the predefined set of criteria is not met.

6. The method of claim 1, further comprising the step of forwarding a request to a power user for obtaining access rights to process the command at the at least one server by using the ACI server when a refusal to access the at least one server is received by the one or more users, wherein the power user is one of the one or more users having additional privileges and wherein the power user is predetermined and a name of the power user is stored at the ACI server.

7. The method of claim 6, wherein the power user retrieves the log to perform an analysis of execution of the steps.

8. The method of claim 6, wherein access rights to process the command at the at least one server is authorized by the power user for a predefined time interval.

9. The method of claim 1, wherein the log server is logically connected to the ACI server.

10. The method of claim 9, further comprising the step of allowing the one or more users to perform an analysis on the log maintained at the log server.

11. An advanced command interface (ACI) server system for providing one or more users with controlled access to at least one server from a plurality of servers, the ACI server comprising:
   one or more processors configured to:
      receive a command through a user command interface on the ACI server from the one or more users to access the at least one server;
      compare the command and impact of the command with a predefined set of criteria, the predefined set of criteria comprising a plurality of skill and role levels corresponding to the one or more users, wherein the predefined set of criteria comprises a list of the one or more users corresponding to a ticket-based authorization and wherein the ticket-based authorization is provided for a predefined time interval;
      forward to a power user a request for obtaining access rights to process the command at the at least one server by using the ACI server when a refusal to access the at least one server is received by the one or more users, wherein the power user is one of the one or more users having additional privileges;
      transmit the command from the ACI server to the at least one server for processing the command at the at least one server, wherein the command is transmitted based on the predefined set of criteria;
      receive a response of the processed command from the at least one server; and
      forward the response of the processed command to the one or more users, wherein the ACI server communicates with a log server, wherein the log server maintains a log of the above steps performed to provide the one or more users with controlled access to the at least one server.

12. The ACI server system of claim 11, wherein the one or more processors are configured to send the refusal to access the at least one server to the one or more users when the predefined set of criteria is not met.

13. The ACI server system of claim 11, wherein the one or more processors are configured to receive an authorization from the power user, the authorization comprises access rights to process the command at the at least one server by the one or more users.

14. The ACI server system of claim 11, further comprising a database to store the plurality of skill and role levels corresponding to the one or more users.

15. The ACI server system of claim 11, wherein to access the at least one server, the one or more users are provided with a predefined number of sessions to reduce a number of mistakes of processing an unintentional command at the at least one server, wherein the predefined number of sessions are controlled by the power user.

16. A computer program product for use with a computer, the computer program product comprising instructions stored in a non-transitory computer usable medium having a computer readable program code embodied therein for providing one or more users with controlled access to at least one server from a plurality of servers by using an advanced command interface server (ACI), the computer readable program code comprising:
   program instructions for receiving a ticket and a command at the ACI server from the one or more users to access the at least one server, wherein the ticket is generated by the one or more users and wherein the ticket provides the a ticket-based authorization to the one or more users to process the command at the at least one server, wherein the ticket-based authorization is provided for a predefined time interval;
   program instructions for comparing the command and impact of the command with a predefined set of criteria, wherein the predefined set of criteria comprises a plurality of skill and role levels corresponding to the one or more users;
   program instructions for transmitting the command from the ACI server to the at least one server for processing the command at the at least one server, wherein the command is transmitted based on the predefined set of criteria and the ticket generated by the one or more users;
   program instructions for receiving a response of the processed command from the at least one server;
   program instructions for forwarding the response of the processed command to the one or more users; and
   program instructions for communicating with a log server, wherein the log server maintains a log of the above steps performed to provide the one or more users with controlled access to the at least one server.

17. The computer program product of claim 16, wherein the ticket is generated by the one or more users using a customer relationship management (CRM) system.

18. The computer program product of claim 16, wherein the one or more users needs to generate a new ticket after the completion of the predefined time interval.

19. A method for providing one or more users with controlled access to at least one server from a plurality of servers by using an advanced command interface (ACI) server, the method comprising the steps of:
   receiving, by means of a processor, a username and a user-generated first password at the ACI server from the one or more users to access the at least one server;
   authenticating the username and the user-generated first password at the ACI server;
   sending a second password from the ACI server to the at least one server based on the authentication of the username and the user-generated first password at the ACI server;

receiving a command at the ACI server from the one or more users to process the command at the at least one server;

comparing the command and impact of the command with a predefined set of criteria, the predefined set of criteria including a plurality of skill and role levels corresponding to the one or more users;

forwarding a request to a power user for obtaining access rights to process the command at the at least one server by using the ACI server when a refusal to access the at least one server is received by the one or more users, wherein the power user is one of the one or more users having additional privileges and wherein the power user is predetermined and a name of the power user is stored at the ACI server;

transmitting the command from the ACI server to the at least one server for processing the command at the at least one server, wherein the command is transmitted based on the predefined set of criteria;

receiving a response of the processed command from the at least one server based on the second password;

forwarding the response of the processed command to the one or more users; and maintaining a log at a log server of the above steps performed to provide the one or more users with controlled access to the at least one server.

20. An advanced command interface (ACI) server system for providing one or more users with controlled access to at least one server from a plurality of servers, the ACI server comprising:

one or more processors configured to:

receive a command through a user command interface on the ACI server from the one or more users to access the at least one server;

compare the command and impact of the command with a predefined set of criteria, the predefined set of criteria comprising a plurality of skill and role levels corresponding to the one or more users;

forward to a power user a request for obtaining access rights to process the command at the at least one server by using the ACI server when a refusal to access the at least one server is received by the one or more users, wherein the power user is one of the one or more users having additional privileges and wherein the power user is predetermined and a name of the power user is stored at the ACI server;

transmit the command from the ACI server to the at least one server for processing the command at the at least one server, wherein the command is transmitted based on the predefined set of criteria;

receive a response of the processed command from the at least one server; and forward the response of the processed command to the one or more users, wherein the ACI server communicates with a log server, wherein the log server maintains a log of the above steps performed to provide the one or more users with controlled access to the at least one server.

* * * * *